United States Patent [19]
Martin et al.

[11] Patent Number: 6,125,117
[45] Date of Patent: Sep. 26, 2000

[54] HYBRID PACKET-CIRCUIT TELEPHONE NETWORK CONFIGURATION

[75] Inventors: Ronald Bruce Martin, Carol Stream; Charles Arthur Witschorik, Naperville, both of Ill.

[73] Assignee: Lucent Technologies Inc., Murray Hill, N.J.

[21] Appl. No.: 08/756,464

[22] Filed: Nov. 26, 1996

[51] Int. Cl.[7] ............................ H04L 12/28; H04L 12/56
[52] U.S. Cl. ........................ 370/397; 370/354; 370/466
[58] Field of Search .................................. 370/352, 395, 370/397, 465, 466, 467, 474, 470, 471, 354, 355

[56] References Cited

U.S. PATENT DOCUMENTS

| | | | |
|---|---|---|---|
| 5,541,917 | 7/1996 | Farris | 370/352 |
| 5,592,477 | 1/1997 | Farris | 370/396 |
| 5,623,491 | 4/1997 | Skoog | 370/397 |
| 5,703,876 | 12/1997 | Christie | 370/395 |
| 5,710,769 | 1/1998 | Anderson et al. | 370/355 |
| 5,717,691 | 2/1998 | Dighe et al. | 370/401 |
| 5,724,355 | 3/1998 | Bruno et al. | 370/401 |
| 5,784,371 | 7/1998 | Iwai | 370/397 |
| 5,802,045 | 9/1998 | Kos et al. | 370/352 |
| 5,809,022 | 9/1998 | Byers et al. | 370/395 |
| 5,867,571 | 2/1999 | Borchering | 370/373 |
| 5,991,301 | 11/1999 | Christie | 370/395 |
| 6,002,689 | 12/1999 | Christie | 370/395 |

*Primary Examiner*—Chau Nguyen
*Assistant Examiner*—Frederic D. Wolkow
*Attorney, Agent, or Firm*—Michael B. Johannesen

[57] ABSTRACT

A new local-toll telephone network configuration which, using aspects of data network configurations in a unique way, supports both voice and data telephone calls. Further, this invention may be used in conjunction with existing switching systems, so that there is a minimal of capital required to upgrade a local switching system for competitive access. An ATM switch is configured so that there are permit virtual circuits (PVCs) connecting switching offices connected to it. The synchronous data stream is connected to asynchronous and the circuit identifier code is included in the payload. Thus, the ATM switch is serving as a conduit for large amounts of data (including packetized voice) between local telephone switching systems while not having to take the time to set up each connection individually.

5 Claims, 3 Drawing Sheets

6,125,117

HYBRID PACKET-CIRCUIT TELEPHONE NETWORK CONFIGURATION

TECHNICAL FIELD

This invention relates to the field of hybrid switching networks, and more specifically, to local-toll telephone networks, which may be economically installed in a competitive environment, yet use the most advanced technology.

BACKGROUND OF THE INVENTION

In the early days of telephone switching switching systems were usually directly linked via trunks. Such trunk connections were efficient in that there were a relatively limited number of switching systems and, thus, a reasonable number of connections to and from each switching office. However, as the number of telephone lines increased, local switching (also known as local-toll) had to be come more sophisticated; each switching office could not be connected to all of its neighbors, due to a large number of switching offices and telephone lines in a given local exchange carrier (LEC). Thus, local-toll switches emerged, which route telephone calls from an originating switch to a destination switch. Such local-toll switching involves sophisticated routing decisions and information being kept at the central local-toll location. That is, the local-toll office keeps information on all of the local offices and lines for purposes of routing calls directed to it. Such centralized routing, while increasing the delay in setting up calls, has proved more efficient than the prior hard-wired physical plant. The local offices no longer need to keep track of a large number of trunks going to a large number of offices; if a call is not locally connectable, the local office merely routes the call to the local-toll switch, which then has the responsibility of routing the call.

In current times, however, competitive access to the local telephony market is becoming a critical issue. Such local access requires a new, wire-line telephone service company to start with no physical plant and increase to the call handling capability of a local exchange carrier (LEC) in a matter of a few months. Such investments in physical plant may be prohibitive in the short run for startup competitive access telephone providers. Additionally, more telephone lines are being used for data transfer. For example, there is an increasing connection of facsimile machines, computers, and Internet connections being made over telephone lines. These data calls are generally more efficient and more economically connected by data transmission methods, rather than by traditional audio-band transmission.

Therefore, a problem in the art is that there is no current system for configuring a competitive access network without investing large amounts of capital.

SUMMARY OF THE INVENTION

This problem is solved and a technical advance is achieved in the art by a new local-toll telephone network configuration which uses aspects of data network configurations in a unique way; that is, to support both voice and data telephone calls. Further, this invention may be used in conjunction with existing switching systems, so that there is a minimal of capital required to upgrade a local switching system for competitive access. At the heart of this network is an asynchronous transfer mode (ATM) switch. However, unlike conventional ATM switches, this ATM switch is configured so that there are permanent virtual circuits (PVCs) connecting switching offices connected to it. Thus, the ATM switch is serving as a conduit for large amounts of data (including packetized voice) between local telephone switching systems while not having to take the time to set up each connection individually.

In this configuration, a table is kept in each switching system to determine a destination for a particular phone call. A trunk group member number and circuit identification code (CIC) is selected to route the call from the originating switch to the terminating switch, as in prior practice (i.e., CCS7 signaling). However, this selection is made from a database that contains point codes for most, if not all, switches within the local exchange carrier (LEC) network (or a subset of the network). This information is passed through a signaling network to the terminating switch. The call is then routed through the selected trunk to a synchronous-to-asynchronous converter (SAC) which encodes the call data into a preselected data stream. This preselected stream is then sent into the packet switching network through a permanent virtual circuit and to a SAC connected to the trunk with the same code at the destination switch. The SAC then converts the asynchronous data stream back to a synchronous data stream. For voice calls, echo cancelers are used to cancel the echo of the asynchronous-to-synchronous delay at the far end. By using permanent virtual circuits through ATM switches, currently existing ATM switches and local switches may be used in the telephone network to quickly implement local-toll service in a competitive environment.

BRIEF DESCRIPTION OF THE DRAWING

A more complete understanding of the invention may be obtained from consideration of the following description, in conjunction with the drawings, in which.

DETAILED DESCRIPTION

Figure 1:
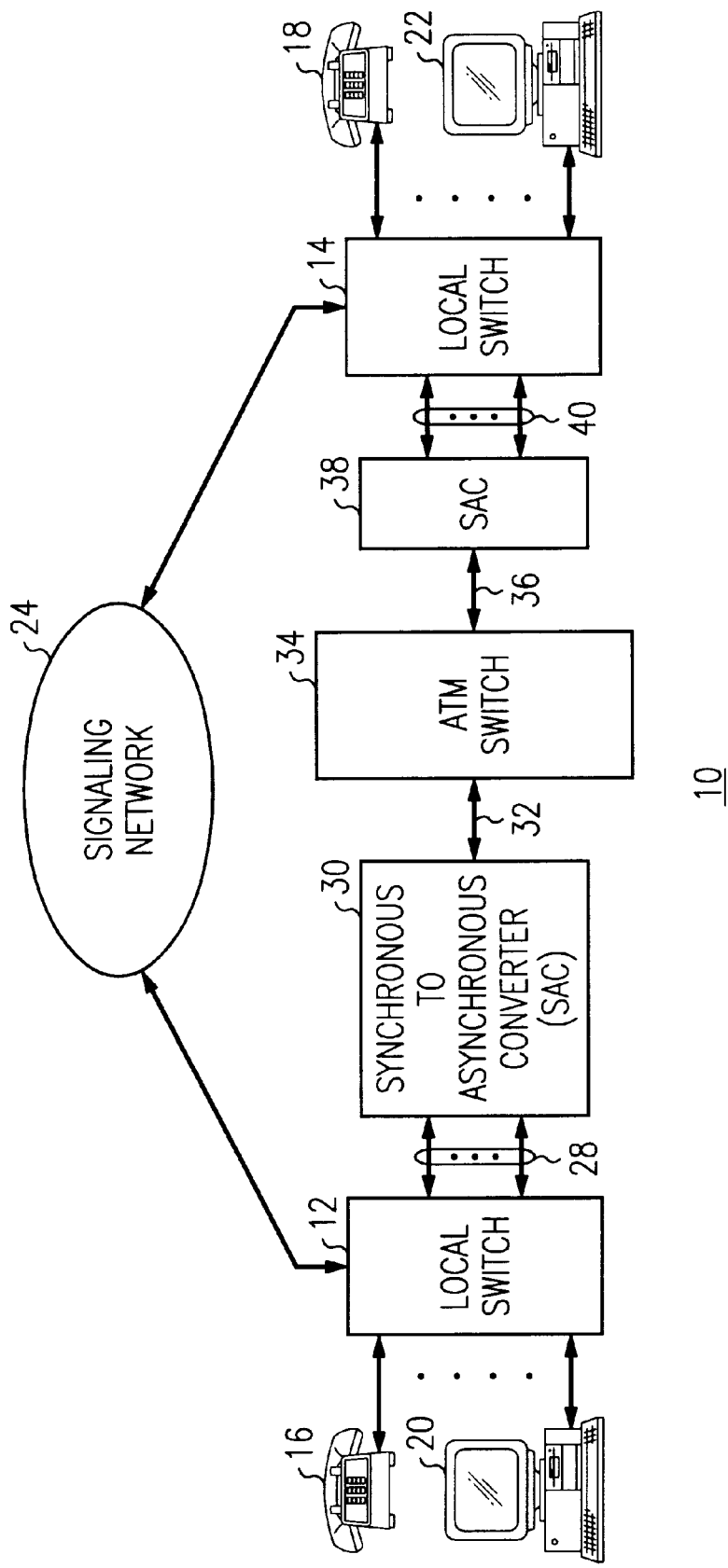
FIG. 1 is a block diagram of a telephone network employing an exemplary embodiment of this invention.

FIG. 1 is a block diagram illustrating the exemplary embodiment of this invention in a local switching network 10. Local switching network 10 comprises a plurality of local switches, here illustrate by local switches 12 and 14, connected to telephones such as 16 and 18, and other devices such as personal computers 20 and 22.

Local switches 12 and 14 are connected via signaling network 24, using a signaling system such as CCS7, as is known in the art. In the current embodiment of this invention, local switch is connected via a plurality of trunks 28 (such as DS 1, for example) to a synchronous-to-asynchronous converter (SAC) 30. As is known in the art, analog signals from, for example, telephone 16, are converted by local switch 12 to digital signals at 64 Kbps. These signals are synchronously transferred through channels such as DS0 and grouped into trunks such as DS 1 (comprising 24 DS0s). SAC 30 receives such synchronous data streams and converts them to an asynchronous data stream such as, for example, a data stream usable by the asynchronous transfer mode (ATM) protocol. SAC 30 will be described further below in connection with FIG. 2.

After conversion, SAC 30 transmits data on link 32 (such as an optical link using OC 3). Link 32 transports a plurality of ATM streams to ATM switch 34. ATM switch 34 may be a single unit as illustrated, or may be a network of ATM switches. ATM switch 34 switches such calls and transmits them on OC 3 36. OC 3 36 delivers asynchronous data to SAC 38, which translates the data from the ATM stream to a synchronous 64 Kbps stream, as expected by local switch 14. Such data streams are then transmitted on one of trunks 40 to local switch 14 for use either in delivering to telephone 18 or, if the connection is data, to computer 22.

According to this invention, when a call is set up between, for example, telephone 16 and telephone 18, local switch 12 performs a translation of the dialed number (of telephone 18), as is known in the art. According to current practice, if the dialed number is not to a line either directly connected to local switch 12, or to a switch directly connected to local switch 12, the call is routed to a local-toll (or tandem) switch. In contrast, according to this invention, local switch 12 performs a translation and determines which local switch is the destination local switch. Such switch-based intelligence requires a larger database of information to cover the entire local-toll area. However, a database check needs to be made according to the prior art, thus no additional steps need to be taken according to this invention.

A message is then sent from local switch 12 through signaling network 24 (known as the "IAM" message or call initial address message). In this message, local switch 12 sends a message to local switch 14, indicating a trunk group and a trunk member (CIC) on which the local switch 14 can expect the call. If local switch 14 has that trunk member (CIC) available, it sends an address complete message back through signaling network 24 to local switch 12. Local switch 12 then begins delivering the call to that particular trunk.

According to this invention, however, instead of a DS 1 such as 28 delivering the call directly to a local switch (or to a tandem switch, as in the prior art), it instead directs the call to a synchronous-to-asynchronous converter (SAC) 30. SAC 30 may be located in the local switching office with switch 12, may be in a remote area by itself, or may be co-located with ATM switch 34. SAC 30 is preprogrammed to recognize data arriving on a particular DS 1 as being destined for a specific local switch, as will be described below in connection with FIGS. 2 and 3. SAC 30 translates the DS 1 and the channel identification to a VPI and VCI, and adds the data or voice samples to the payload of an ATM cell. Importantly, the CIC code is inserted into the payload of each ATM cell so that the receiving SAC can route and reassemble the samples. SAC 30 then delivers the ATM cell to a carrier such as optical carrier 3 (OC 3) 32.

OC 3 32 delivers the packetized data into an ATM switch 34. ATM switch 34 switches the call according to the VPI/VCI, as is known in the art. However, according to this invention, no path is set up through ATM switch 34 for this one particular call. Instead, ATM switch 34 treats all ATM packets as if there were a nailed-up connection. That is, ATM switch 34 automatically forwards a data packet from a receive stream to a deliver stream without having to have the individual stream set up; they are semi-permanently set up. Thus, ATM switch 34 is not connected to signaling network 24 (for those calls), and there is no per-call overhead through the local network. ATM switch 34 delivers the call to OC 3 36, which then delivers the data to SAC 38. SAC 38 performs conversion from ATM to PCM, performs DS 0 level switch according to the CIC in the payload, and delivers the call data or voice samples to DS 1 40. DS 1 40 delivers the call to local switch 14, which connects the call to its destination (in this example, telephone 18).

Thus, by use of this invention, local telephone systems may use existing switching equipment, and existing ATM switches, in order to route local calls economically. Merely by adding a SAC, either at the local switch area or at the ATM area, calls can be routed throughout the local area. The local switches merely need to be programmed to recognize other local destinations (as they were when there was total connectivity in the past). The local area needs to be engineered and load balanced so that the number of trunks to each SAC, the number of OC 3s can be balanced, but such engineering needs to be performed currently. Therefore, an economical local area toll telephone service may be achieved without adding overhead to set up time and by utilizing the new ATM technology.

Figure 2:
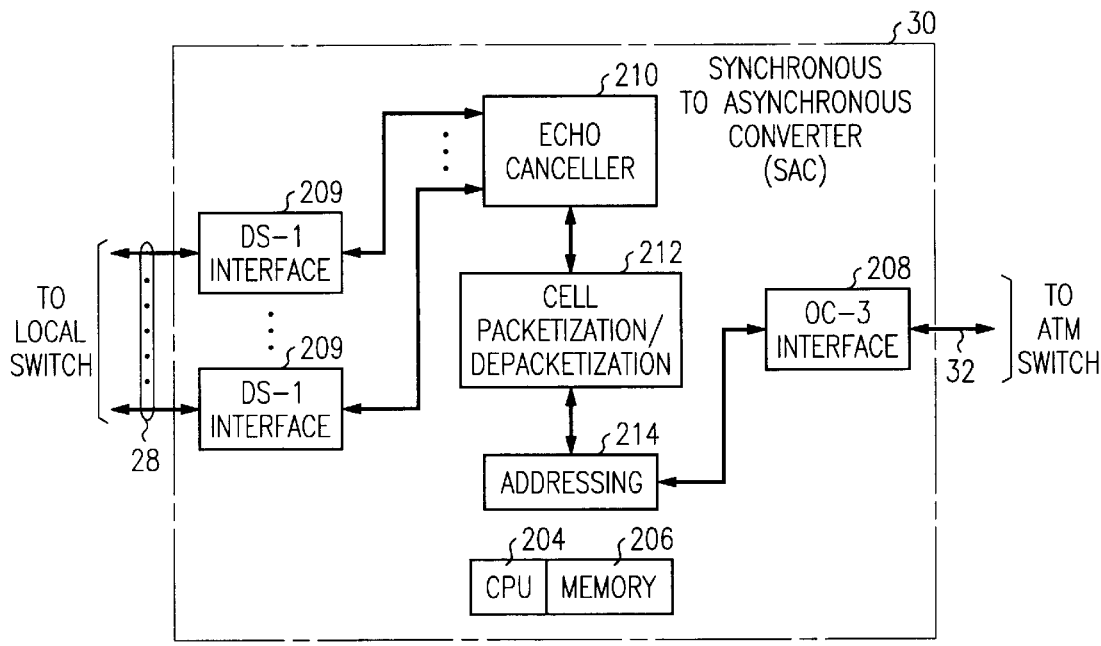
FIG. 2 is a block diagram of a synchronous to asynchronous converter as illustrated in FIG. 1.

Turning now to FIG. 2, a synchronous-to-asynchronous converter (SAC), such as 30 (and also 38), is shown. According to this invention, DS1's 28 enter SAC 30 at DS1 interface 209, as known in the art. SAC 30 includes a CPU 204 and memory 206, wherein controller 204 recognizes that a call on a specific DS1 receives a specific VPI/VCI and is output on a specific OC3 interface 208. SAC 30 also inserts the CIC in the payload on a per DS 0 sample basis.

From DS1 interface 209 the signal stream proceeds through an echo canceling circuit 210. Such echo canceling is needed to compensate for the packetization delay from the PCM voice conversion to ATM cells. If the call is a data call, then such echo cancellation is not necessary.

Processing then continues to data packetization/depacketization circuit 212, wherein the voice data samples are loaded/unloaded from the payload of an ATM cell, and the CIC is loaded in/unloaded, as will be described further below in connection with FIG. 3.

Processing then continues to the addressing circuit 214, which performs the translation from DS1 and the channel to the ATM address. Packet processing then proceeds to OC 3 interface 208, which converts from digital to optical and sends the ATM packets out on OC3 transmission lines 32.

Figure 3:
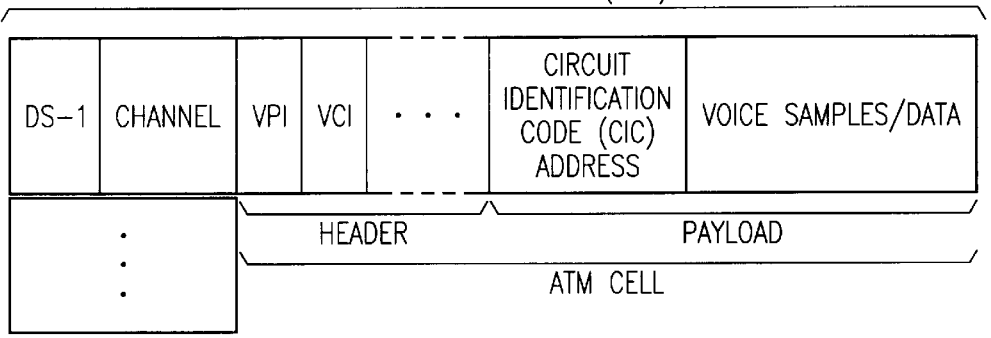
FIG. 3 is a block diagram of a translation table, as found in the synchronous-to-asynchronous converter of FIG. 2.

Turning now to FIG. 3, a mapping of DS1 to VPI/VCI is shown, as would be made in memory. SAC controller 204 (FIG. 2), when it performs addressing conversion, performs a lookup in data memory 206, which is set by recent change. When data is received on a specific DS1 and a specific channel it is destined for a predetermined destination. Thus, for example, the VPI/VCI translation could be as simple as the VPI and VCI being equivalent to the point code for the destination switch. In the cell samples, the first two bytes would be the circuit identification code (CIC) and then 46 voice sample packets, as is known in the art. By virtue of the permanent virtual circuits, this table does not have to change until load balancing is performed or until DS1s are added or dropped.

Figure 4:
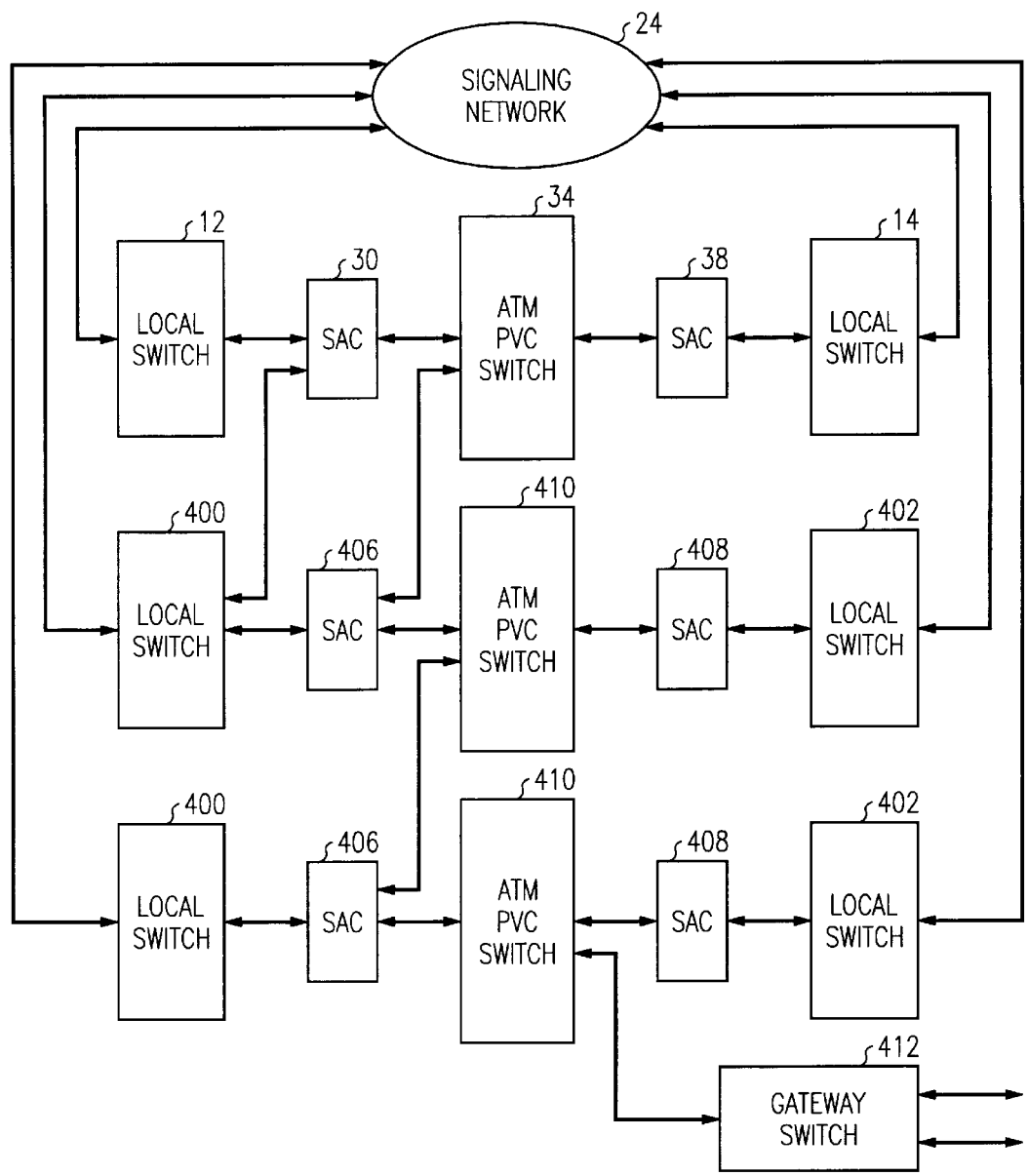
FIG. 4 is an illustration of a more complex local telephone network using the present embodiment of this invention.

Turning now to FIG. 4, a more complex network is shown in block diagram. Signaling network 24, switch 12, SAC 30, ATM PVC switch 34, SAC 38, and local switch 14 are the same or similar to those shown in FIG. 1. However, further switches 400 and 402 are shown along with additional SACs 406 and 408. Further, there is an additional one or more ATM PVC switches 410. In order to insure network reliability, if there is more than one connection required between SACs in a local network, it is probable that each would be routed through a separate ATM PVC switch such as 410. In this manner, redundancy, as is known in the telephony art, and its inherent reliability may be maintained. Additionally, each ATM PVC switch, such as 410, may be connected to a gateway 412 and, thus, to other ATM gateways and other local area networks using ATM technology.

It is to be understood that the above-described embodiment is merely an illustrative principle of the invention, and that many variations may be devised by those skilled in the art without departing from the scope of this invention. It is, therefore, intended that such variations be included within the scope of the claims.

The invention claimed is:

1. A local telephone network comprising:

a plurality of local switching systems;

a plurality of synchronous-to-asynchronous converters (SACs), wherein each of said SACs is connected to at least one of said local switching systems, is configured to convert a synchronous stream of data to and from one or more of said local switching systems to and from an asynchronous stream of data of a prespecified packet switch and includes means for adding and removing a circuit identifier code for said synchronous stream of data into and out of said asynchronous stream of data for use in routing said data to a destination; and a plurality of asynchronous transfer mode packet switches configured so that packets arriving at a prespecified input port are routed to a preassigned output port, each of said packet switches being connected to a predetermined number of said SACs;

each of said plurality of local switching systems being connected to all of the other local switching systems by permanent virtual circuits through one or more of said SACs and one of said packet switches.

2. The local telephone network of claim 1 further including a gateway switch in said packet network for connecting said local telephone network to one or more other local telephone networks.

3. A local telephone switching system comprising:

a telephone switch generating and receiving a sychronous stream of data; and a synchronous-to-asynchronous converter (SAC) for converting said synchronous stream of data to an asynchronous stream of data connected to the telephone switch via trunks and connected to a packet switching network and configured to utilize a permanent virtual circuit through the packet switching network to convey said asynchronous data through the packet switching network, and means for adding and removing a circuit identifier code for said synchronous stream of data into and out of said asynchronous data for use in routing said sychronous stream of data to a destination.

4. The local telephone switching system of claim 3 wherein said packet switching network comprises an asynchronous transfer mode switching network.

5. The local telephone switching system of claim 3 wherein the packet network delivers packets according to data addresses in the packets and wherein the SAC includes translation means for translating an incoming trunk to a destination data address and for translating an incoming data address to an outgoing trunk.

* * * * *